(12) United States Patent
Loce et al.

(10) Patent No.: US 7,719,719 B2
(45) Date of Patent: May 18, 2010

(54) SHARPENING A HALFTONED IMAGE (75) Inventors: Robert P. Loce, Webster, NY (US);
Yeqing Zhang, Penfield, NY (US);
Beilei Xu, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 855 days.

(21) Appl. No.: 11/522,610

(22) Filed: Sep. 18, 2006

(65) Prior Publication Data

US 2008/0068660 A1 Mar. 20, 2008

(51) Int. Cl.
*H04N 1/405* (2006.01)
*H04N 1/409* (2006.01)

(52) U.S. Cl. .................. 358/3.06; 358/1.9; 358/3.27

(58) Field of Classification Search ........... 358/3.06, 358/1.9, 1.1, 1.2, 2.1, 3.01, 3.02, 3.03, 3.04, 358/3.05, 3.07, 3.08, 3.09, 3.1, 3.11, 3.12, 358/3.13, 3.14, 3.15, 3.2, 3.26, 3.27, 3.3, 358/1.11, 1.18, 1.15, 534, 535, 536; 382/254, 382/255, 266, 267, 268, 269, 264; 345/596, 345/611, 616, 617, 89; 347/131; 399/180, 399/181
See application file for complete search history.

(56) References Cited

U.S. PATENT DOCUMENTS

| 5,581,667 | A | * | 12/1996 | Bloomberg ............. 358/1.9 |
| 6,744,531 | B1 | | 6/2004 | Mestha et al. |
| 6,898,312 | B2 | | 5/2005 | Schröder |
| 2003/0090729 | A1 | | 5/2003 | Loce et al. |
| 2003/0179409 | A1 | | 9/2003 | Nishida |
| 2004/0085592 | A1 | | 5/2004 | Feng et al. |
| 2005/0104974 | A1 | | 5/2005 | Watanabe et al. |
| 2006/0132847 | A1 | | 6/2006 | Xu et al. |

OTHER PUBLICATIONS

Digital Filters webpage printout showing Digital Filters Contents, 3 pages dated Sep. 1, 2006.
Spatial Filters webpage printout showing Mean Filter, 6 pages dated Sep. 1, 2006.
Spatial Filters webpage printout showing Gaussian Smoothing, 8 pages dated Sep. 1, 2006.
Digital Filters webpage printout showing Frequency Filters, 13 pages dated Sep. 1, 2006.
Digital Filters Glossary printout showing Kernel, 1 page dated Sep. 1, 2006.

(Continued)

*Primary Examiner*—Dov Popovici
(74) *Attorney, Agent, or Firm*—Fay Sharpe LLP (57) ABSTRACT Images that include halftone structures are sharpened. A copy of received halftone image data is blurred, thereby reducing a detectability of edges of the halftone structures. Edges remaining in the blurred image data are detected. An edge enhancement image is generated based on the detected edges. The original received halftone image data is combined with the edge enhancement image, thereby generating sharpness enhanced image data having halftone structures. The sharpness enhanced image data having halftone structures can be rendered through a halftone screen that is compatible with a halftone screen that was used to generate the originally received image data. Alternatively, the sharpness enhanced image data having halftone structures is rendered according to error diffusion techniques, such as, rank order error diffusion in order to achieve or maintain dot or halftone structure compaction.

26 Claims, 7 Drawing Sheets

OTHER PUBLICATIONS

Spatial Filters webpage printout showing Laplacian/Laplacian of Gaussian, 8 pages dated Sep. 1, 2006.
Spatial Filters webpage printout showing Unsharp Filter, 10 pages dated Sep. 1, 2006.

J. R. Parker, *Algorithms for Image Processing and Computer Vision*, Copyright 1997 by John Wiley & Sons, Inc., Wiley Computer Publishing, John Wiley & Sons, Inc., pp. 23-25.

* cited by examiner

SHARPENING A HALFTONED IMAGE

BACKGROUND

The present exemplary embodiments relate to methods and systems for improving sharpness of halftoned images. Embodiments find particular application in conjunction with document processing systems and will be described with particular reference thereto. However, it is to be appreciated that some embodiments are amenable to other applications.

It is sometimes desirable to enhance the sharpness of an image. For example, an available document may be the result of many generations of photocopying or may have become diffuse with age or mishandling. Or, it may simply be that a user of an image may consider an image to be unsuitably sharp as a matter of aesthetic preference. Nevertheless, there may be a need or desire to use a copy of the image for some purpose such as, for example, for inclusion in a publication, for archival purposes or for investigative or evidentiary purposes. For instance, a portion of a photograph, outside the depth of field of a photographic lensing system used to create the image, may be of particular interest. In instances such as these, it is useful to sharpen or improve a definition between edges or boundaries of objects within the image or document. For instance, there can be a desire to improve a distinctiveness or reduce fuzziness at the edges of characters in a text document, between image objects, such as people and real world objects depicted in photographic images, or between elements of a business graphic, such as bars of a bar chart or wedges of a pie chart.

Where image data is available in contone format wherein image pixels describe an input or desired color with one or more values in a relatively broad range of, for example, 0 to 255 (i.e., in 8 bit quantization systems), edge detection algorithms can be used to locate edges of image objects such as the edges or boundaries of test characters, lines, bars and pie wedges, and real world objects. When an image is described in terms of contone values, there is a high probability that sudden pixel-value-to-adjacent-pixel-value changes in the image data are associated with an edge or boundary of an image object. Accordingly, detecting edges of image objects based on the sudden or abrupt pixel value changes can be very reliable. Therefore, in order to enhance the sharpness of image objects represented in terms of contone pixel values, edge detection algorithms can be used to detect the boundaries of image objects and edge or contrast enhancement algorithms can be applied to the image data to enhance the apparent sharpness of the image object edges. For instance, the boundaries of text characters can be identified and pixels within or on the boundaries can be darkened while pixels external to the boundaries can be lightened.

However, image descriptions are not always available in terms of contone values. Sometimes, image descriptions are only available in what is referred to as a binary or other relatively highly quantized format (compared to the quantization used for contone values). Binary image description formats are useful because many marking engines are typically limited to placing a mark or not placing a mark at any given pixel location. Binary image formats describe an image in terms of placing a mark or not placing a mark. Even where pixels are referred to as—high addressable—and describe pixels with more than two (on, off) states of a binary format, ultimately, they describe binary states of a cluster of spots wherein each member of the cluster is either marked or unmarked.

These quantized or binary image descriptions are often generated by applying a halftoning or quantization reduction process to an image described in other terms. Therefore, herein we refer to all binary or highly quantized image descriptions as halftoned. In halftoned images, the lightness, darkness or intensity of colors in areas of an image is associated with a relative spatial density of positive or negative marking decisions. Where quantization reduction is achieved through halftone screening, darkness or lightness or color intensity is associated with the relative size and/or spatial frequency of occurrence of resulting halftone structures, such as, halftone spots, lines or other shapes. In totally saturated (e.g., completely dark) regions of an image, the halftone structures grow to such a size that they meet or blend together and do not pose a particular problem for edge detection algorithms.

However, intermediate shades of gray or highlight colors are associated with halftone structures that are spaced from one another. For example, referring to FIG. 1, an enlarged view 110 of a gray or highlight region of an image includes relatively isolated halftone structures 114. A darker region 118 of the image portion 110 includes relatively large halftone structures, while a relatively light region 126 includes relatively small halftone structures. However, all of the halftone structures include clearly defined boundaries or edges 130.

Figure 1:
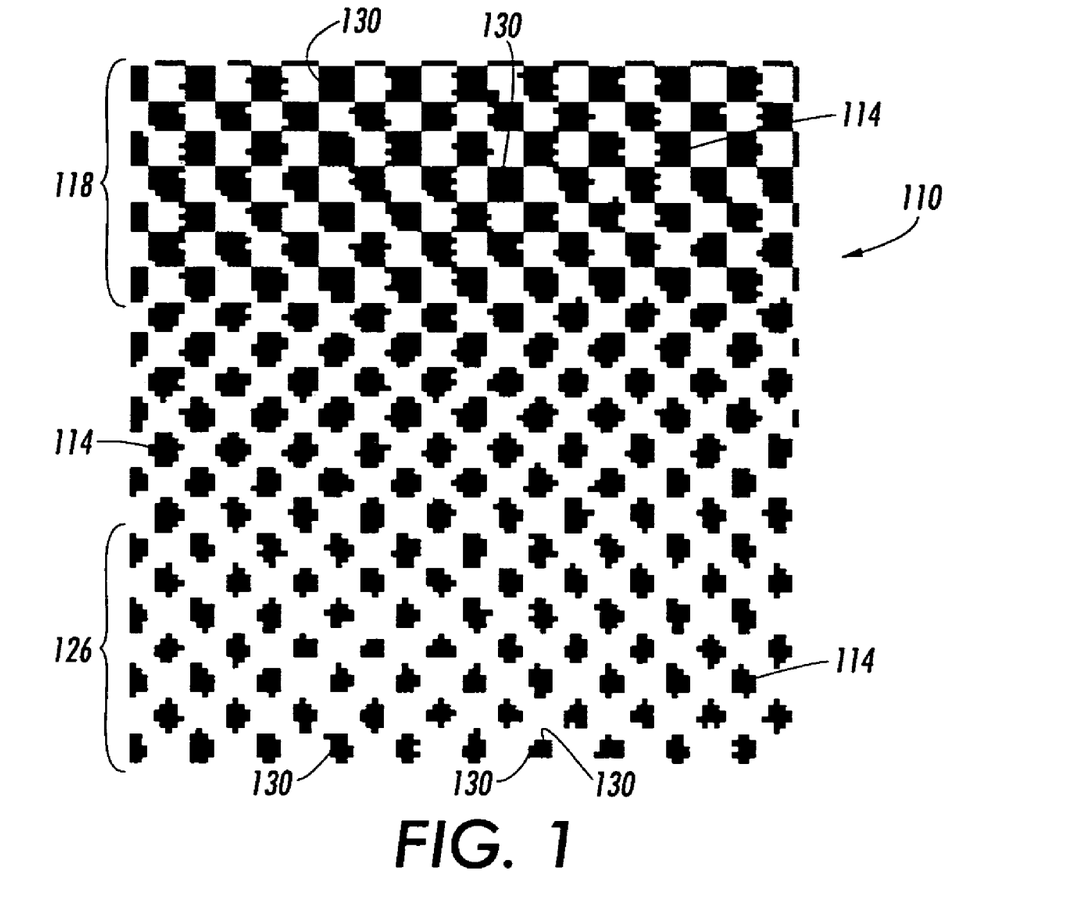
FIG. 1 is an enlarged view of image data that includes halftone structures.

Each of these boundaries or edges 130 is associated with abrupt changes in pixel values between neighboring pixels. For instance, pixels having pixel values of 1 (or 255) are directly adjacent to pixels having values of 0. Accordingly, edge detection algorithms processing such halftoned images would identify the boundaries of each halftone structure (e.g., 114) as an edge to be processed according to an edge enhancement algorithm.

However, typically, this effect is not desired. Instead, what is desired is to locate the edges or boundaries of large image objects, such as the manmade or naturally occurring objects depicted in a photograph or the lines and text or business graphic elements of non-photographic portions of documents.

Attempts to address this problem and to provide edge enhancement for images where image data is only available in a halftoned, binary or reduced quantization level format include processes referred to as—descreening—halftoned image data and then applying a sharpening technique to the descreened version of the image data. For example, descreening includes spatially low pass filtering the image data thereby causing halftone structures (e.g., 114) to spread out or blend together. Such descreening algorithms are often associated with the side effect of blurring or unsharpening the very image objects for which sharpening is desired. Therefore, descreening the image data that is to be rendered can be counterproductive to the purpose of sharpening the image data and techniques that include descreening and then sharpening the image data to be rendered can yield an image that is still less sharp than one might want.

Figure 2:
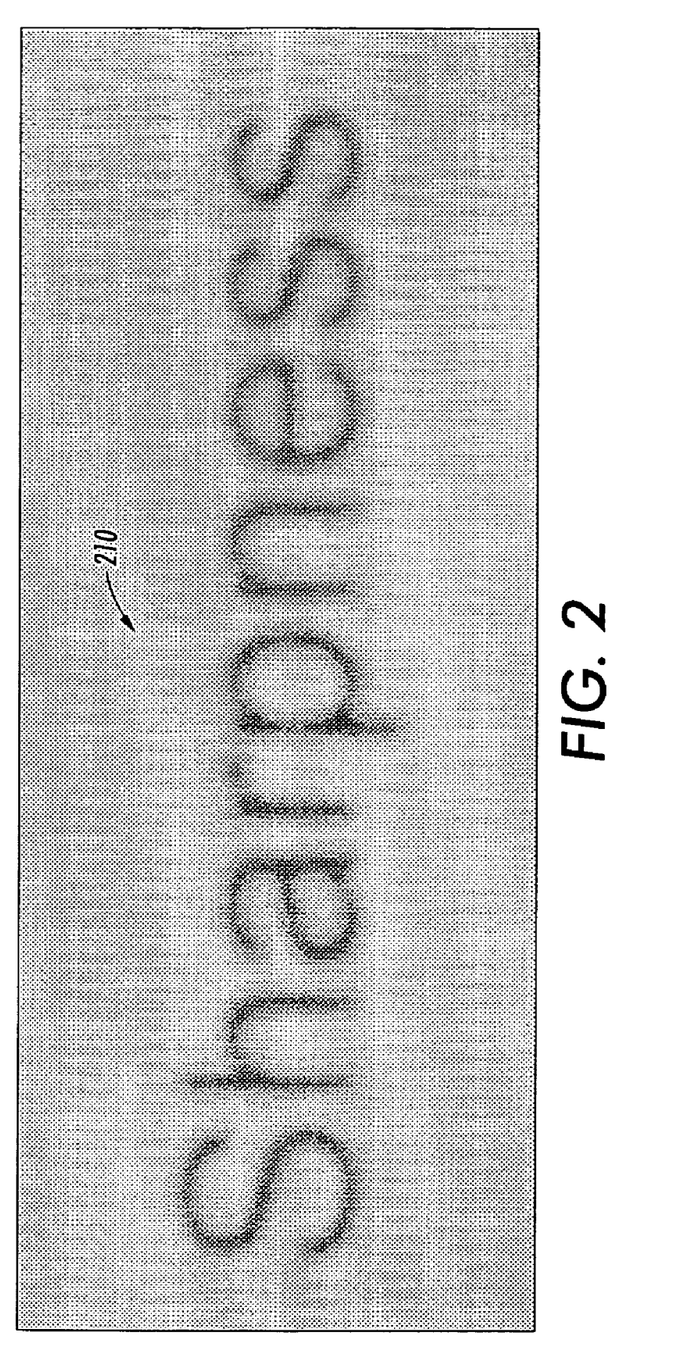
FIG. 2 is a view of illustrative input image data that includes halftone structures.
Figure 3:
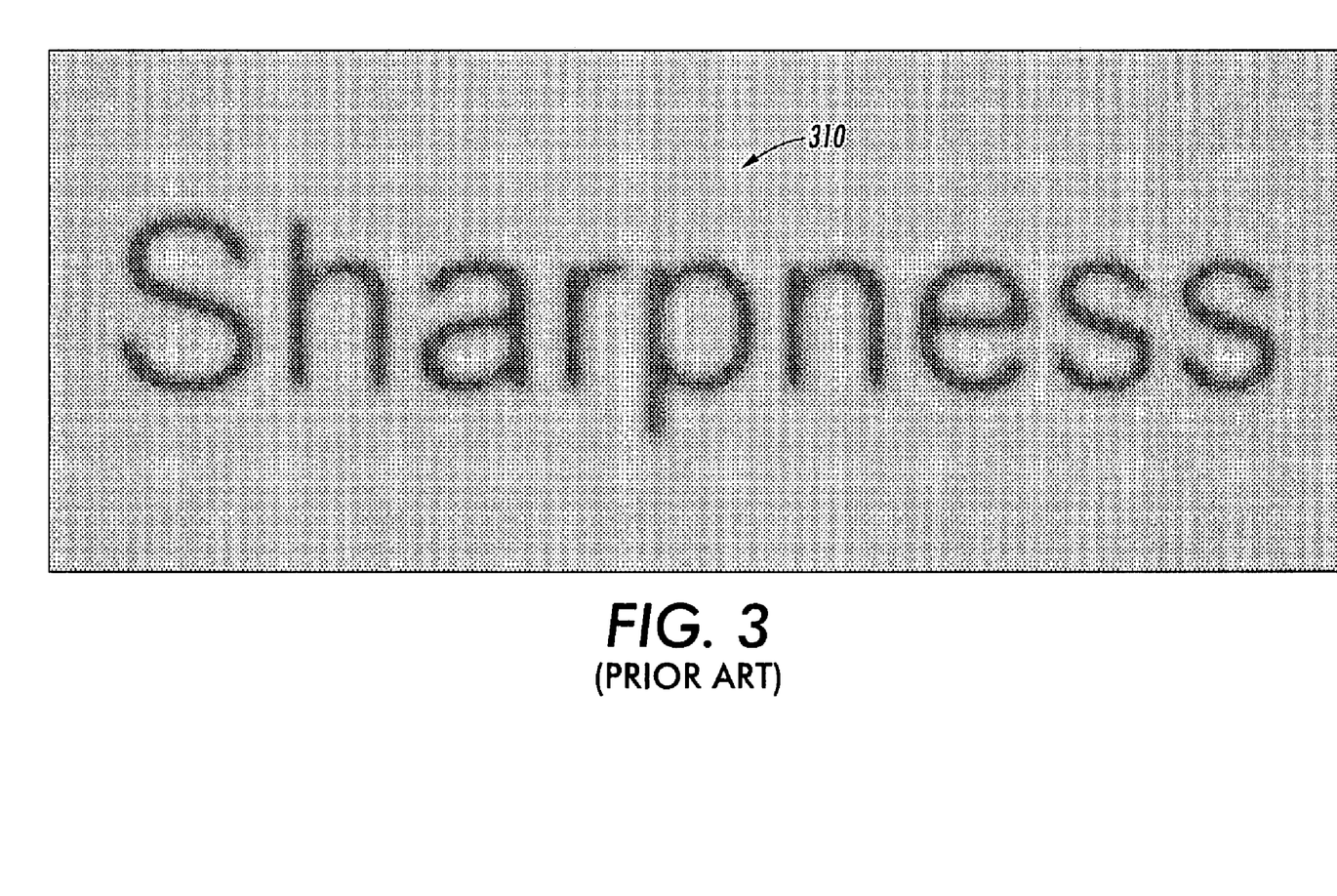
FIG. 3 is a view of illustrative output image data produced according to a prior art sharpening method applied to the image data represented in FIG. 1.

For example, referring to FIG. 2, an input image 210 is blurry due to some defect that may have occurred prior to halftoning. For instance, a user may have scanned an old blurry image that was halftoned at some point in its history. Descreening, sharpening and rescreening can be applied to the image data of the input image 210. For example, referring to FIG. 3, descreening, sharpening and rescreening algorithms were applied sequentially to the image data of the input image 210 according to a wide range of descreening and sharpening parameters. A prior art output image 310 illustrates the sharpest or best overall image that could be achieved.

Accordingly, there is a desire for systems and methods for producing images with improved sharpness based on half-toned input image data.

BRIEF DESCRIPTION

A method for producing sharpness enhanced image data having halftone structures based on input image data that includes halftone structures can include blurring a copy of the image data, thereby generating blurred image data wherein a detectability of edges of the halftone structures is reduced from the detectablity of the edges of the halftone structures in the received image data, detecting detectable edges remaining in the blurred image data, generating an edge enhancement image based on the detected edges and combining the input image data that includes halftone structures with the generated edge enhancement image, thereby generating sharpness enhanced image data having halftone structures.

The method can also include applying a form of error diffusion to the sharpness enhanced image data having halftone structures, thereby generating marking decisions for the sharpness enhanced image data having halftone structures. For example, the marking decisions can be made by applying a form of rank order error diffusion to the sharpness enhanced image data having halftone structures. In some instances the marking decisions are made by applying the same halftone screen(s) that was (were) used to generate the original input image data.

An image processor that is operative to produce sharpness enhanced image data having halftone structures based on input image data that includes halftone structure can include an image receiver, a blurring mechanism, an edge detector, an enhancement image generator and an image combiner. For example, the image receiver that can be operative to receive the image data that includes halftone structures and the blurring mechanism can be operative to blur a copy of the received image data, thereby generating blurred image data wherein a detectability of edges of the halftone structures is reduced from the detectablity of the edges of the halftone structures in the received image data. The edge detector can be operative to detect detectable edges remaining in the blurred image data and the enhancement image generator can be operative to generate an edge enhancement image based on the edges detected by the edge detector. The image combiner can be operative to combine the received image data that includes halftone structure with the generated edge enhancement image, thereby generating sharpness enhanced image data having halftone structures.

Some embodiments can include a rendering module. For example, the rendering module can be operative to apply a halftone screen having frequency components that are harmonically compatible with respective to the frequency components of a halftone screen used to generate the received image date to the sharpness enhanced image data having halftone structures, and/or to apply a form of error diffusion to the sharpness enhanced image data having halftone structures, thereby generating marking decisions for the sharpness enhanced image data having halftone structures. For example, the rendering module can be operative to apply a form of rank order error diffusion to the sharpness enhanced image data having halftone structures, thereby generating marking decisions for the sharpness enhanced image data having halftone structures.

DETAILED DESCRIPTION

Figure 4:
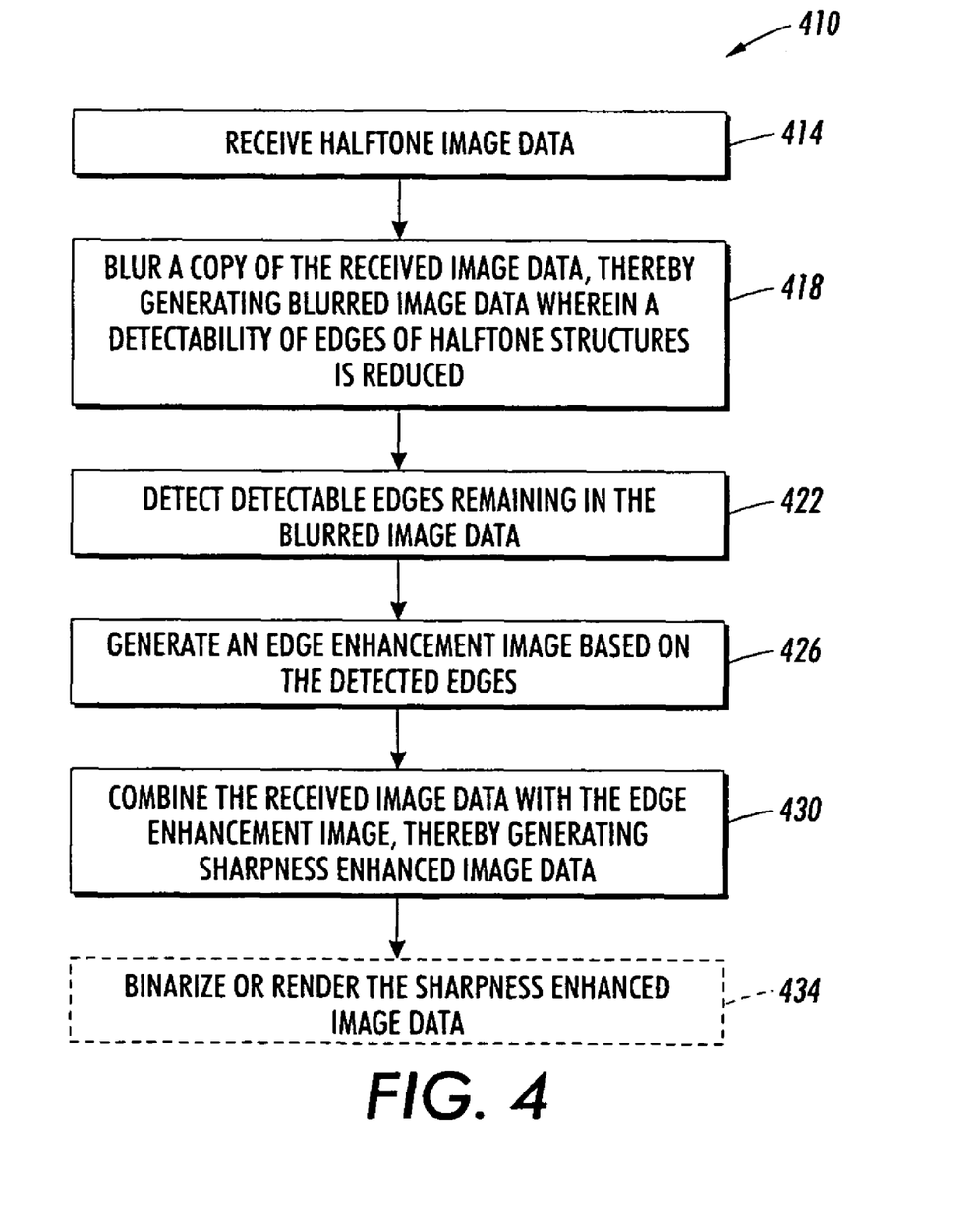
FIG. 4 is a flow chart outlining a method for producing sharpness enhanced image data having halftone structures.

A method 410 for producing sharpness enhanced image data having halftone structures based on input image data that includes halftone structures can include receiving 414 the halftone image data, blurring 418 a copy of the received image data, detecting 422 detectable edges remaining in the blurred image data, generating 426 an edge enhancement image based on the detected edges and combining 430 the received image data with the edge enhancement image thereby generating sharpness enhanced image data having halftone structures.

For example, receiving 414 halftone image data can include receiving a printed halftone image. Alternatively, halftone image data can be received 414 in an electronic form, such as, a computer file including binary or highly quantized (i.e., to a reduced number of quantization levels) image data. Electronic files can be received on computer media, such as floppy disks, CD ROM, DVD ROM, hard drives and memory cards. Additionally, electronic files can be received over communications networks, such as the Internet, intranets and phone networks.

When the image is included on a print media, such as paper or velum, receiving 414 can be taken to mean simply receiving the printed image or document. Alternatively, scanning or generating an electronic image from the printed image can be considered to be included in the receiving 414 process. Even though such a scanning process typically generates contone values, the scanned image data possesses significant halftone structures. For example, the gray levels of the scanned image data will be near the extremes of the available contone range due to the halftone structures (e.g., 114) included in the document being scanned. For instance, the scanned image data of a halftoned or binarized image will contain many values near 0 and 255 (in an 8 bit system) and a relatively few intermediate values due to sensor alignment issues and the like. All images having these binary, nearly binary or quantized characteristics are referred to herein as halftoned images.

Blurring 418 a copy of the received image data generates blurred image data wherein a detectability of edges of halftone structures in the image data is reduced. Blurring 418 can be achieved through the application of spatial low pass filters. Additionally, or alternatively, some or all of the blurring 418 may be achieved in a scanning or edge detection process. For instance, when a halftone image is scanned, for example, during a copying procedure or image input procedure, it is highly unlikely that the locations of the marked (e.g., 114) and unmarked portions of the image will exactly coincide with the locations of sensors in the scanning device. Therefore, a marked spot may only be partially in the field of view of a related image sensor. For this and other reasons, scanning halftone images can include some degree of blurring 418. Additionally, or alternatively, some edge detection algorithms include blurring or filtering as part of their edge detection algorithm. For example, the Canny edge detection algorithm, defined by John Canny in 1986, typically includes a convolution filter that smoothes Gaussian white noise assumed to be included in the image data. When appropriate parameters are selected for this convolution filter, the convolution filter of the Canny edge detection algorithm can contribute to the blurring 418 of the copy of the received image data.

Typically, the blurring process will generate contone image data including more intermediate contone values. For instance, through the blurring 418 process, pixels in the blurred image that are associated with white space between halftone structures (e.g., 114) are assigned darker pixel values while pixels associated with dark halftone structures in the received input image (e.g., 114) are assigned lighter contone pixel values. That is, some of the darkness of the halftone structures is spread or blurred into regions that were white or unmarked on the received halftone image data. Accordingly, the detectability of the edges of the halftone structures is reduced.

When blurring 418 a copy of the received image data includes separate or additional filtering, any appropriately adapted low pass filtering or descreening technique known in the art may be used. For example, applicable filtering techniques include, but are not limited to, mean filters, Gaussian smoothing, triangular, rectangular and sinc$^2$ filters and filters applied in the frequency domain or wavelet domain can be used to blur 418 a copy of the received image data to reduce the detectability of halftone structures (e.g., 114) and their associated edges (e.g., 130).

Many of these spatial domain filter algorithms are associated with a convolution kernel (or simply—kernel—). A kernel is a matrix or array of parameters or weights that are respectively applied to pixel values of target pixels and/or pixels neighboring the target pixel. The size of the kernel (e.g., in pixels) and/or the values of the parameters included in the kernel can be selected or optimized for the purpose of blurring halftone structures.

The mean filter replaces or associates the value of a target pixel with an average value of pixels in the neighborhood of the target pixel (including the value of the target pixel itself). For example, for general image processing, a 3×3 kernel might be used. Since a 3×3 kernel includes nine positions, the weight or parameter in each position is ⅑ or a close approximation thereto. The weights are applied to the values of the target pixel and eight pixels surrounding the target pixel. The sum of these nine products is then determined and used as a replacement value or a related value associated with a pixel position in an output image corresponding to a position of the target pixel. If a 5×5 kernel were used, the selected weight for each pixel position within the kernel might be ¹⁄₂₅.

Gaussian smoothing filters are similar to mean filters. However, the parameters or values in the kernel are distributed within the kernel according to, for example, a one or two-dimensional Gaussian distribution, and the size of the kernel is related to a selected standard deviation of the distribution and integer approximations associated therewith. This Gaussian distribution provides heavier weights for pixels near the target pixel (with the target pixel itself being associated with the highest weight) and lower weights to pixels furthest from the target pixel.

Rectangle, triangle, and sinc$^2$ filters are similar to Gaussian filters in that the weights for the pixels in the kernel are assigned according to their respective distribution type (e.g., weights in a triangle filter decrease from a central value according to a triangular pattern).

The parameters, including kernel size, of each of these filter algorithms can be selected or optimized to the task of blurring halftone structures. For example, where Gaussian smoothing is to be applied, the kernel width or size can be selected so that the width of the kernel where the values of the weights or parameters of the kernel are, or fall below, one half the maximum weight or parameter value in the kernel (e.g., associated with the target pixel) is, for example, an integer multiple of the width of a halftone cell, or similar parameter associated with the halftoning or binarization of the original image. For example, halftone or binary images created by techniques other than halftone screening nevertheless include local halftone periodicities. These periodicities may vary as a function of the gray level of pixels. However, dimensions associated with these periodicities can be determined and kernel dimensions or half maximum widths can be selected based on these periodicities.

For instance, kernel dimensions or one-half maximum amplitude dimensions can be selected to be about one to about four times the period of a halftone cell associated with the rendering of the original input halftone image or with a local periodicity associated with error diffusion or other non-screen based binarization techniques. The significant width or dimension of a kernel wherein the weights or parameters of the kernel are determined based on a Gaussian or other continuous function can be somewhat arbitrary. That is, for example, the Gaussian function extends to infinity. A kernel that attempted to approximate the full Gaussian function would likewise have an infinite width. Since this is not practical, kernels associated with Gaussian smoothing are truncated at a point where the associated weights or parameters are deemed to be no longer significant. For example, in some embodiments, the kernel width associated with weights or parameters at or below the one-half amplitude value determines the boundaries of the kernel. In some embodiments, kernel parameters or weights having a value of 1/e or 1/e$^2$ the value of the maximum parameter or weight in the kernel define the significant width of the kernel.

Other filter functions such, as sinc$^2$ that are infinite in extent can have kernel dimensions that are defined in a manner similar to that described above with regard to the Gaussian filter. The boundaries or dimensions of kernels associated with finite filters, such as the rectangle and triangle, are associated with the bounds of the functions.

Detecting 422 detectable edges remaining in the blurred image data can include applying any of a wide variety of edge detection algorithms. For example, one of a Canny edge detector, an unsharp edge detection algorithm or a Laplacian edge detection algorithm can be applied to the blurred image data to find edges of image objects such as natural and man-made objects occurring in photographic images and/or text, lines and/or business graphic objects, rather than the edges of individual halftone structures.

For example, a Canny edge detection algorithm involves convolving image data with a kernel that includes weights or parameters associated with the first derivative of the Gaussian function.

The unsharp filter algorithm operates by subtracting a smooth or low pass filtered version of an image from the original image. Accordingly, the output of the unsharp algorithm is a representation of the high-frequency components or edges of the original image.

The Laplacian edge detection algorithm determines the second derivative of the image data being processed. Typically the second derivative or Laplacian is determined by convolving the image data with a 3×3 kernel wherein the position associated with the target pixel is associated with the parameter or weight value of 8 and the surrounding neighboring pixels are associated with a parameter value or weight of −1. A second kernel that is commonly used to determine the second derivative or Laplacian includes a value of 4 in the center or target pixel position, values of 0 in the four corner positions and values of −1 in the positions above and below and to the right and left of the center position or target pixel.

Figure 5:
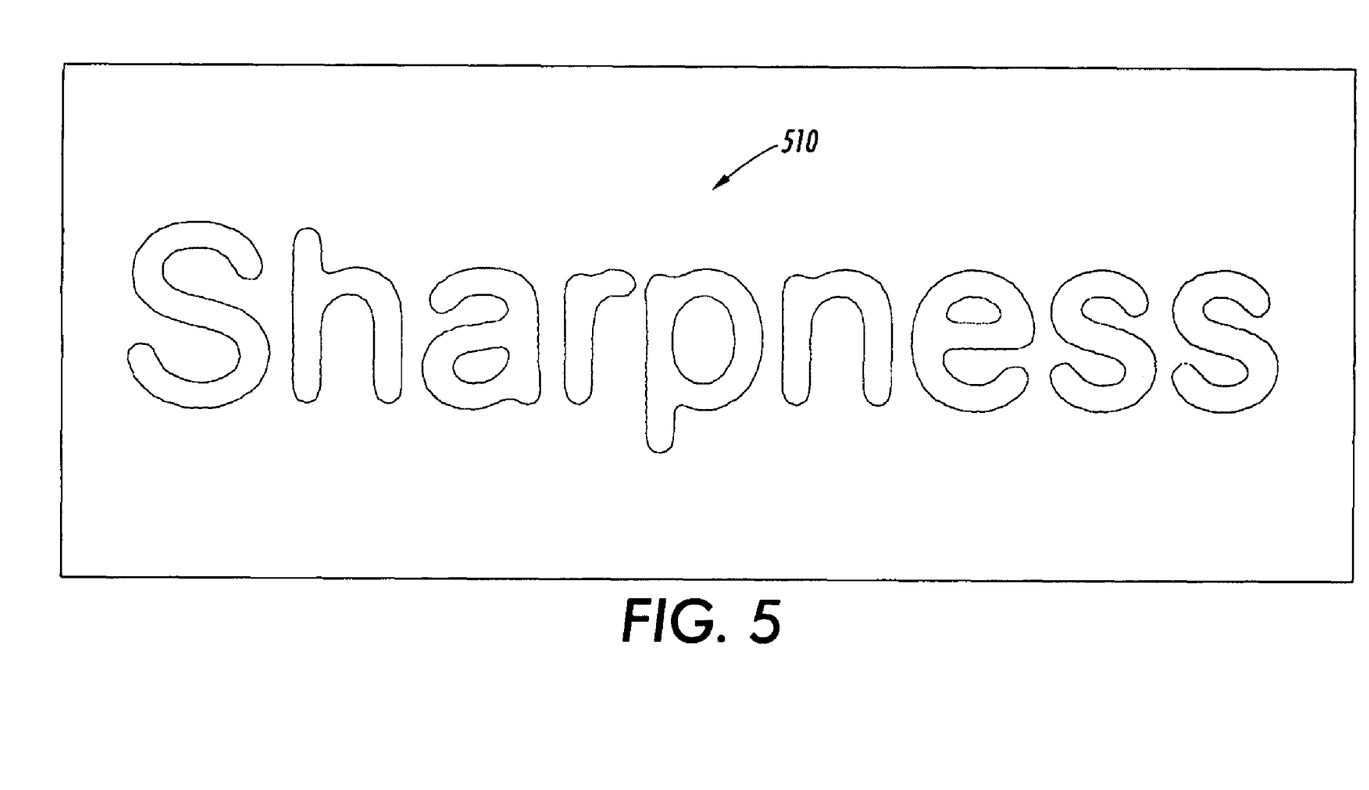
FIG. 5 is a view of an illustrative edge enhancement image.

Generating 426 an edge enhancement image based on the detected edges can occur as an immediate consequence of the edge detection 422 algorithm processing. For example, referring to FIG. 5, given a blurred 418 version of the input image 210 as the input to an unsharp algorithm used to detect 422 detectable edges remaining in the blurred image data, the output image might be a detected edge image 510. This detected edge image 510 might be considered a generated 426 edge enhancement image based on detectable edges remaining in the blurred image data. Such a generated 426 edge enhancement image might be combined 430 with the received image data in order to generate sharpness enhanced image data having halftone structures. Alternatively, the edge detection image (e.g., 510) may be further processed to generate 426 an edge enhancement image or serve as the basis for generating 426 an edge enhancement image. For example, the outputs of Canny edge detectors or Laplacian edge detectors may include undesired background or offset data. Such a background or offset might have to be subtracted away from filter output in order to arrive at detected edge data (e.g., 510). Additionally, or alternatively, other types of edge enhancement images may be desired and generated 426 based on the detected edge data (e.g., 510). For example, it may be desired to darken all pixels within closed loops or to one side of detected edges, such as within the outlines of letters depicted in FIG. 5, and/or to lighten pixels outside of such closed loops. Accordingly, generating 426 an edge enhancement image can include generating an image having dark pixels on one side of the detected edge and lighter pixel values on the other side of a detected edge wherein the detected 422 edges are first described in a detected edge output image (e.g., 510).

The generated 226 edge enhancement image can be combined 430 with the received 414 image data by any appropriate image combination technique. For example, typically the output of a blurring 418 process will be image data describing the blurred image in terms of contone values. For example, whether or not the received 414 halftone image data is received in a binary format (i.e., ones and zeros) or in a contone format with halftone characteristics (i.e., substantially including contone values near the extremes of a contone value range, such as near 255 and 0), the received 414 image data can be construed, or processed or transformed, into related contone values (e.g., 255, 0). Accordingly, the generated 426 edge enhancement image can be combined with the received halftone image data through arithmetic operations such as addition, subtraction, multiplication, division, and selecting a maximum or minimum value between the images. The resulting contone values, or even over-range contone values, can then be further processed for rendering as will be described in greater detail below.

Alternatively, the edge enhancement image and the received 414 image data can be combined through logical operations. That is, the received 414 halftone image data may be received in or converted to a binary format (e.g., ones and zeros) and the edge enhancement image may be generated 426 or converted through a binarization process into a binary format. The image data of the two images can be combined according to Boolean logical operations, such as ANDing, ORing, and/or exclusive ORing (XOR).

Figure 6:
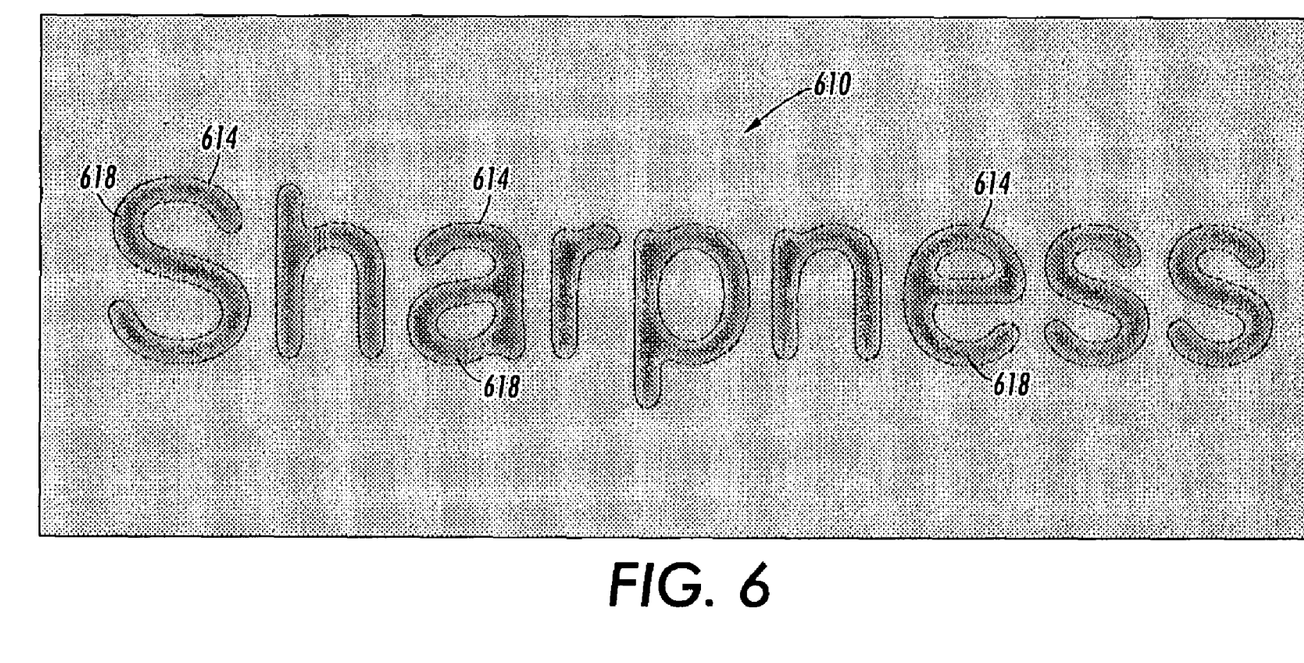
FIG. 6 is a view of illustrative sharpness enhanced image data having halftone structures.

Referring to FIG. 6, combining 430 a generated 426 edge enhancement image (e.g., 510) with received 414 halftone image data (e.g., 210) can yield sharpness enhanced image data having halftone structures (e.g., 610). Note, for example, that combining the received 414 image data (e.g., 210) with edge detection data (e.g., 510) provides a definite border 614 around the image objects (e.g., 618) and provides a sharper appearance for the image objects. However, as noted above, other edge enhancement images can be generated 426 and combined with received halftone image data in different ways.

Where the received 414 halftone image data and the generated 426 edge enhancement image are available in binary format and combined 430 according to logical operations, the sharpness enhanced image data having halftone structures can be in binary or marking decision format. Accordingly, the sharpness enhanced image data having halftone structures can be printed or displayed on a binary device without further processing.

However, where the image combination 430 includes a combination of contone values, the sharpness enhanced image data having halftone structures may need to be binarized or halftoned 434 before the sharpness enhanced image data having halftone structures can be printed or otherwise displayed on a binary rendering device. The binarization or halftoning process can have an impact on the perceived sharpness of the printed or displayed sharpness enhanced image data having halftone structures. Where the particulars (e.g., screen frequency, screen type, threshold values, etc.) of the halftone screen or screens used to render or binarize the received 414 halftone image data are known, it may be appropriate to use the same, or a harmonically compatible, halftone screen or set of screens to render or binarize the sharpness enhanced image data having halftone structures. A screen that is harmonically compatible with another screen is one that will not be perceived as generating displeasing artifacts or moiré if the two screens are applied to image data in some manner that allows frequency components of the screens to beat against one another.

However, in some circumstances, including where the halftone screen or screens used to generate the received 414 halftone image data is (are) unknown, it may be appropriate to render the sharpness enhanced image data having halftone structures according to some form of error diffusion in order to avoid the production of moiré patterns that some may be perceived as a form of blurriness, or be otherwise displeasing. Such moiré could occur if frequency components of an original halftone screen used to generate the received 414 halftone image data beat with frequency components of a different selected halftone screen used to render or binarize 434 sharpness enhanced image data having halftone structures. In order to avoid such moiré, convention error diffusion (ED) or rank order error diffusion (ROED) can be used to render or binarize 434 the sharpness enhanced image data having halftone structures.

In the conventional forms of error diffusion used to generate binary representations of images (variations related to high-addressability pixels will be discussed below), a contone pixel value (e.g., typically ranging from 0 to 255 in 8-bit systems) is compared to some threshold in order to make a marking decision. For instance, the threshold can be the same for every pixel in an image or the threshold can vary, for example, according to a halftone screen. If the pixel value is above the threshold, a first marking decision is made. If the pixel value is below the threshold, the alternative marking decision is made. For example, if the pixel value is above the threshold, the decision to place a mark is made. If the pixel value is below the threshold, a decision is made not to place a mark and to leave the print media blank (e.g., white). These marking decisions are associated with contone values. For example, placing a mark is associated with the contone value of 255. Not placing a mark is associated with a contone value of zero. Therefore, the decision to place a mark or not place a mark is associated with a lightness or darkness error. For example, if the threshold value is 130 and a pixel value of a target pixel is 150, a decision may be made to place a mark. However, placing a mark at the point in the image corresponding to the target pixel position makes that portion of the image darker than is called for by the pixel value of the target pixel. Placing a mark is associated with a contone value of 255, whereas target pixel value only calls for a darkness associated with the contone value 150. Accordingly, that portion of the image associated with the target pixel is considered to be 105 contone value counts too dark. Conventional forms of error diffusion address this issue by a lightening (e.g., subtracting contone counts from) the pixel values of pixels neighboring the target pixel. Where the sense of the error is in the opposite direction (i.e., where a decision not to mark causes the portion of the image to be lighter than called for by the value of the target pixel), darkness is added (or lightness is subtracted) to (from) the values of one or more neighboring pixels.

For example, a selected diffusion mask identifies pixels neighboring the target pixel for receiving a distribution of error associated with the marking decision made regarding the target pixel. For instance, a pixel immediately to the right of the target pixel may receive 50 percent of the error, while pixels further away and/or below the target pixel receive other percentages of the error based on their position relative to the target pixel.

This means that a marking decision made relative to a gray or intermediate contone valued pixel generated as a result of blurring 418 can cause other pixels to be revalued to the other side of the marking decision threshold. For instance, where blurring 418 has generated an estimated pixel value of a first pixel immediately adjacent a dark cluster of pixels (e.g., 114) of a halftone dot to be a gray value of 125, and a second pixel neighboring the first pixel and further from the halftone dot to have a value of 71, conventional error diffusion can generate a marking decision to make the first pixel unmarked and the second neighboring pixel marked. That is, since the first neighboring pixel has a value of 125, which is below the threshold of 130, the decision is made to leave the portion of the image associated with the first neighboring pixel unmarked. However, this generates an error. The area associated with the first neighboring pixel is now 125 counts too light. Therefore, darkness is added to the neighboring pixels. For example, 50 percent of the error, or 63 counts, may be added to the value of the second neighboring pixel raising its value to 132. Therefore, when the second neighboring pixel becomes the target pixel of the conventional error diffusion process, the marking decision will be to mark the area associated with the second neighboring pixel. In this way, fingers, hairs and isolated spots can be generated. These artifacts can be perceived as contributing to a fuzzy or blurriness of a printed or rendered image.

In contrast, applying an adaptive packing form of error diffusion concentrates darkness in the darkest available pixels and concentrates lightness in the lightest available pixels and reduces or prevents the formation of the fingers, hairs and isolated spots.

For example, in rank ordered error diffusion, neighboring pixels within a selected diffusion mask or window of pixels neighboring the target pixel are ranked according to the darkness or lightness represented by their respective pixel values. Error associated with a marking decision made regarding a target pixel is then distributed according to that ranking. Instead of distributing 50 percent of the error to the first neighboring pixel, simply because of the position of the first neighboring pixel relative to the target pixel, darkness is added first to the darkest pixels within the window and/or lightness is distributed to the lightest pixels within the window.

Therefore, when blurring 418 generates gray or intermediate contone pixel values using rank order error diffusion to make marking decisions and distribute error tends to provide for pixels in the input image to be associated with decisions to place a mark and for light pixels in the input image to be associated with decisions not to place a mark. This tends to improve the compactness of halftone structures and reduce or eliminate the production or generation of fuzzy fingers, hairs and isolated spots.

Adaptive packing forms of error diffusion (e.g., ROED) may also be applied to render high-addressable pixels. However, instead of thresholding to one of two binary states (mark or unmark, 1 or 0, 255 or 0), additional thresholds are used to make sub-pixel or pixel event marking decisions.

High-addressability or high-addressable pixels may be used where, for example, a print engine or rendering device can be controlled with more precision than is called for by the printing resolution. For example, in some xerographic print engines, a position of a laser spot can be controlled with greater precision than is required to produce marks at the standard resolution of the printer (e.g., 600 spots per inch). For instance, while a diameter of a laser beam spot may be on the order of 0.00167 inches (corresponding to a 600 spots per inch resolution specification), it may be possible to possible to position that laser with a precision on the order of 0.0008, 0.0004 or 0.0002 inches. Accordingly, with such rendering devices, it is possible to mark or address a pixel at sub-pixel or high-addressable pixel event resolutions. For instance, a portion of an image represented by a pixel may be addressed as 2, 4, 8 or more sub-pixels or high-addressable events.

In such circumstances, it may be beneficial to apply an adaptive packing form of error diffusion that quantizes transform output image data to more than the two binary states. For example, where a high-addressable pixel includes 4 high-addressable events, 4 quantization thresholds may be used to determine if submarks are to be applied to 0, 1, 2, 3 or 4 of the high-addressable events. The availability of high addressability reduces the magnitude of the errors to be distributed to neighboring pixels. However, the process for ranking neighboring pixels and distributing error associated with marking decisions made relative to the target pixel are the same as described above.

Rank order error diffusion may be implemented in many different ways. For example, all the error associated with a marking decision may be transferred to a single neighboring pixel (i.e., the darkest or lightest pixel within a selected diffusion window). Alternatively, all or some of the pixels within the window may be assigned a weight or percentage based on their rank and receive error from the marking decision associated with the target pixel according to their assigned weight. In yet another embodiment, error is distributed to neighboring pixels within the distribution window according to their rank until each pixel is at a saturation value (e.g., 255, 0) or until all the error is distributed, whichever occurs first. In other embodiments, ranking is a function of both pixel value and pixel position. For example, weights or offsets are assigned to pixels based on their position within the diffusion mask or window whereby pixels closer to the target pixel may tend to be ranked higher (or lower) than pixels further from the target pixel. That is, for the purposes of ranking, an offset bias or amplifying coefficient may be applied to the actual pixel value to implement a position-based preference for the distribution of error. Furthermore, various combinations of these and other variations can be used.

Figure 7:
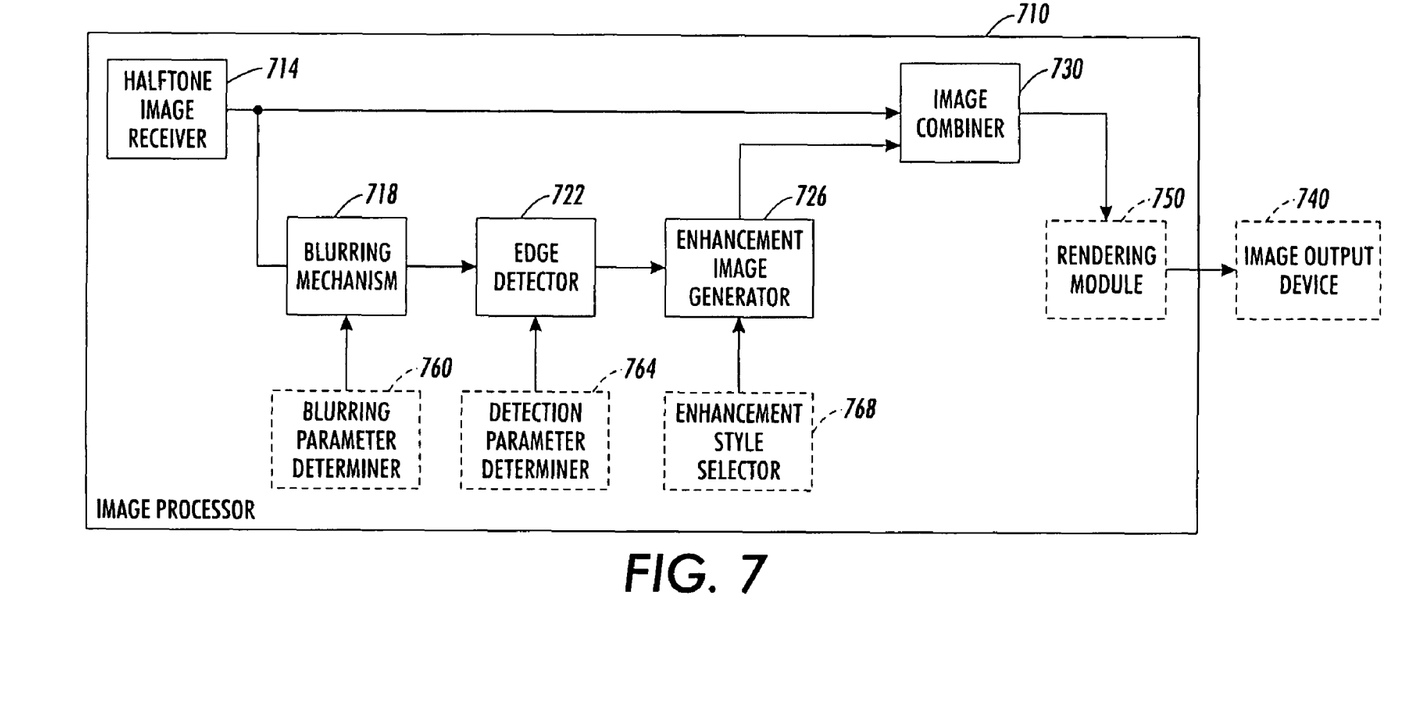
FIG. 7 is a view of an illustrative image processor that can be operative to perform embodiments of the method outlined in FIG. 4.

Referring to FIG. 7, an image processor 710 that is operative to produce sharpness enhanced image data having halftone structures based on input image data that includes halftone structures (e.g., 114) can include a halftone image receiver 714, a blurring mechanism 718, an edge detector 722, an enhancement image generator 726 and an image combiner 730.

For instance, the image receiver 714 is operative to receive 414 halftone image data. For example, the image receiver 714 can be operative to receive 414 halftone image data from computer storage devices, such as, for example, computer hard drives, floppy drives, optical disks, and computer memory cards. In some embodiments, the image receiver 714 is operative to receive 414 halftone image data over computer networks such as office intranets, internets or via telephone communication networks. Additionally, or alternatively, the halftone image receiver 714 can include, or be in communication with, an electronic camera or document scanner and receive 414 halftone image data therefrom.

The blurring mechanism 718 can be operative to blur a copy of the received 414 image data thereby generating blurred image data wherein a detectability of edges of the halftone structures in the halftone image data is reduced from the detectability of the edges of the halftone structures in the received 414 image data. For example, the blurring mechanism 718 may be operative to apply a low pass filter or, for example, a mean filter, Gaussian smoothing filter, a triangular blurring kernel, a rectangular blurring kernel, and/or a $sinc^2$ blurring kernel to the copy of the received 414 image data. Additionally, or alternatively, some or all of the blurring mechanism 718 may be achieved as a consequence of a scanning process associated with the halftone image receiver 714 or as a consequence of the application of an edge detection algorithm by the edge detector 722.

The edge detector 722 can be operative to detect 422 detectable edges remaining in the blurred image data. For instance, the edge detector may apply a Canny edge detector, unsharp edge detector and/or a Laplacian edge detector to the blurred image data received from blurring mechanism 718. The output of the edge detector 722 includes an indication (e.g., 510) of the location of edges remaining in the blurred image data.

The enhancement image generator 726 can be operative to generate 426 an edge enhancement image based on the edges detected by the edge detector 722. In some embodiments, the edge enhancement image is generated as a consequence of the edge detection 422 carried out by the edge detector 722. In these embodiments, the enhancement image generator 726 is considered to be included within the edge detector 722. In some embodiments or applications, the output of the edge detector 722 is further processed to generate 426 or forms the basis for generating 426 an edge enhancement image (e.g., 510). For example, in some embodiments, the output of the edge detector 722 is an edge image that includes background or offset information that is not useful for identifying image object edge locations. In these instances, the enhancement image generator 726 processes the output from the edge detector 722 to remove this background or offset information to better define the edges. Additionally, or alternatively, the edge enhancement generator 726 may use the output of the edge detector 722 to identify pixels to be darkened and/or identify pixels to be lightened in a combined original image/enhancement image output image. For example, the enhancement image generator 726 may generate an enhancement image that, when combined with the received 414 halftone image data, will lighten pixels on one side of the detected 422 edges and darken pixels on the other side of the detected 422 edges.

The image combiner 730 can be operative to combine 430 the received 414 image data with the generated 426 edge enhancement image thereby generating sharpness enhanced image data having halftone structures. For instance, the image combiner can combine the images through arithmetic, non-linear (e.g., max, min) and/or logical (ANDing, ORing, XORing) operations as described above.

In some embodiments, the sharpness enhanced image data having halftone structures is stored in an electronic image data storage device (not shown). In some embodiments or instances, the sharpness enhanced image data having halftone structures may be printed or displayed directly on an associated image output device (e.g., 740). In other embodiments or instances, the sharpness enhanced image produced by the image combiner 730 is further processed or prepared to be rendered on an associated image output device. In such instances, the image processor 710 may include a rendering module 750. For example, the rendering module 750 may binarize or render 434 the sharpness enhanced image data having halftone structures by halftoning or through a process of error diffusion, such as rank order error diffusion. Where identification information regarding the halftone screen or screens used to generate the halftone image received 414 by the halftone image receiver 714 can be determined and/or delivered to the rendering module 750, the rendering module 750 may binarize or render 434 the sharpness enhanced image data having halftone structures by halftoning the sharpness enhanced image data having halftone structures through the same screen or screens used to render the received 414 halftone image data (or a screen or screens harmonically compatible therewith). Alternatively, in some embodiments or instances, such as where input image halftone screen information is not available, the rendering module 750 may binarize or render 434 the sharpness enhanced image data having halftone structures by applying a form of error diffusion, such as, for example, rank order error diffusion, as described above.

Each of these modules or functional blocks (714, 718, 722, 726, 730, 750) can be associated with various parameters for customizing their operations to a particular task or image. Accordingly, each of the modules (714, 718, 722, 726, 730, 750) can be associated with a determiner for selecting appropriate parameters. For example, blurring mechanism 718 can be associated with a blurring parameter determiner 760, the edge detector 722 can be associated with a detection parameter determiner 764 and the enhancement image generator can be associated with an enhancement style selector 768. Each of the determiners (760-768) can include a mechanism for communicating with a user whereby the user enters or makes parameter or style selections. Additionally, or alternatively, the determiners (760-768) may select parameters on an automatic or semi-automatic basis. For instance, the blurring parameter determiner 760 may analyze the received 414 image data to determine a kernel size or other filter or kernel parameters for appropriately blurring a copy of the received 414 halftone image data. The detection parameter determiner 764 may select an edge detection algorithm best suited to detect edges in the blurred image data received from the blurring mechanism. Furthermore, parameters for customizing or optimizing the selected edge detection algorithm may also be determined. The enhancement style selector 768 may, for example, give an image processor 710 user a means for selecting a simple edge outline enhancement (e.g., 610) or more sophisticated enhancement images, such as, for example, darkening pixels on one side and/or lightening pixels on another side of located edges and/or darkening or lightening pixels within closed loops formed by detected edges.

Each of the modules or functional blocks described above (e.g., 714, 718, 722, 726, 730, 750, 760, 764, 768) can be implemented in hardware or software or combinations thereof. To the extent that the modules are implemented in software, the software may be run on microprocessors, microcontrollers, digital signal processors, or other computational elements. The modules or functional elements (714, 718, 722, 726, 730, 750, 760, 764, 768) are illustrated separately for clarity. Their associated functions may be provided in various other architectures and system structures and be given other functional names.

The words "printer" and/or "rendering module" as used herein, encompass any apparatus, such as a digital copier, book making machine, facsimile machine, multi-function machine, etc., which performs a print outputting function for any purpose. Moreover, the word "rendering module" may also include other display devices, such as LED displays and liquid crystal displays, which might operate on a binary or quantized basis.

For clarity, the description above was not specific to monochrome or color image data or rendering devices. It is to be understood that the methods and systems disclosed herein are applicable to both monochrome and color images, image data and rendering modules or devices.

It will be appreciated that various of the above disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

The invention claimed is:

1. A method for producing sharpness enhanced image data having halftone structures based on input image data that includes halftone structures, the method comprising:
   receiving the image data that includes halftone structures;
   blurring a copy of the image data, thereby generating blurred image data wherein a detectability of edges of the halftone structures is reduced from the detectability of the edges of the halftone structures in the received image data;
   detecting detectable edges remaining in the blurred image data;
   generating an edge enhancement image based on the detected edges; and
   combining the received image data that includes halftone structures with the generated edge enhancement image, thereby generating sharpness enhanced image data having halftone structures.

2. The method of claim 1 wherein at least a portion of the blurring occurs as an aspect of a scanning process used to generate the copy of the image data.

3. The method of claim 1 wherein at least a portion of the blurring occurs as an aspect of applying a Canny edge detector to the copy of the image data.

4. The method of claim 1 wherein at least a portion of the blurring occurs as an aspect of applying a filtering kernel to the copy of the image data.

5. The method of claim 4 wherein applying a filtering kernel to the copy of the image data comprises:
   applying at least one of: a Gaussian blurring kernel, a triangular blurring kernel, a rectangular blurring kernel, and a sinc$^2$ blurring kernel to the copy of the image data.

6. The method of claim 4 wherein a recognized width of the kernel is one of: at least as large as a local halftone periodicity of the copy of the image data, at least as large as a halftone cell dimension of the received image data, from about one to about four times the halftone cell dimension of the received image data.

7. The method of claim 1 wherein detecting edges comprises:
   enhancing ahe contrast of the blurred image data, thereby generating contrast enhanced image data; and
   detecting detectable edges in the contrast enhanced image data.

8. The method of claim 7 wherein detecting edges comprises:
   applying a Canny edge detection algorithm to the contrast enhanced image data.

9. The method of claim 8 wherein combining the received image data with the generated edge enhancement image comprises:
   one of: adding, subtracting, selecting a maximum of, and selecting a minimum of respective pixel values of the edge enhancement image to, from or and, respective pixel values of the received image data.

10. The method of claim 9 further comprising:
    applying a form of error diffusion to the sharpness enhanced image data having halftone structures, thereby generating marking decisions for the sharpness enhanced image data having halftone structures.

11. The method of claim 10 wherein applying a form of error diffusion comprises:
    applying a form of rank order error diffusion to the sharpness enhanced image data having halftone structures.

12. The method of claim 9 further comprising:
    applying a halftone screen having frequency components that are harmonically compatible with respective frequency components of a halftone screen used to generate the received image data to the sharpness enhanced image data having halftone structures, thereby generating marking decisions for the sharpness enhanced image data having halftone structures.

13. The method of claim 1 wherein combining the received image data with the generated edge enhancement image comprises:
    one of: logically ANDing, logically ORing, logically exclusive ORing, respective pixel values of the edge enhancement image, with respective pixel values of the received image data, thereby generating the sharpness enhanced image data having halftone structures as marking decisions.

14. An image processor that is operative to produce sharpness enhanced image data having halftone structures based on input image data that includes halftone structures, the image processor comprising:
    an image receiver that is operative to receive the image data that includes halftone structures;
    a blurring mechanism that is operative to blur a copy of the received image data, thereby generating blurred image data wherein a detectability of edges of the halftone structures is reduced from the detectability of the edges of the halftone structures in the received image data;
    an edge detector that is operative to detect detectable edges remaining in the blurred image data;

an enhancement image generator that is operative to generate an edge enhancement image based on the edges detected by the edge detector; and an image combiner that is operative to combine the received image data that includes halftone structure with the generated edge enhancement image, thereby generating sharpness enhanced image data having halftone structures.

15. The image processor of claim 14 wherein the image receiver and the blurring mechanism comprise:

an image scanner that is operative to receive the image data in a form of a halftone image printed on print media, scan the print media at a scanner resolution and/or scanner alignment that is different from a screen frequency and/or screen alignment used in printing the halftone image, thereby generating scanned image data wherein the detectability of edges of the halftone structures is reduced from the detectability of the edges of the halftone structures in the printed halftoned image and whereby the scanned image data comprises the blurred image data.

16. The image processor of claim 14 wherein the blurring mechanism is operative to blur the received image data by applying at least one of: a Gaussian blurring kernel, a triangular blurring kernel, a rectangular blurring kernel, and a $sinc^2$ blurring kernel to the copy of the image data.

17. The image processor of claim 16 wherein a recognized width of the kernel is one of: at least as large as a local halftone periodicity of the copy of the image data, at least as large as a halftone cell dimension of the received image data, from about one to about four times the halftone cell dimension of the received image data.

18. The image processor of claim 14 wherein the edge detector is operative to detect edges by enhancing a contrast of the blurred image data, thereby generating contrast enhanced image data and detecting detectable edges in the contrast enhanced image data.

19. The image processor of claim 18 wherein the edge detector is operative to detect edges by applying a Canny edged detection algorithm to the contrast enhanced image data.

20. The image processor of claim 14 wherein the image combiner is operative to combine the received image data with the generated edge enhancement image by one of: adding, subtracting, selecting a maximum of, and selecting a minimum of respective pixel values of the edge enhancement image to, from or and, respective pixel values of the received image data.

21. The image processor of claim 20 further comprising:
a rendering module that is operative to apply a form of error diffusion to the sharpness enhanced image data having halftone structures, thereby generating marking decisions for the sharpness enhanced image data having halftone structures.

22. The image processor of claim 21 wherein the rendering module is operative to apply a form of rank order error diffusion to the sharpness enhanced image data having halftone structures, thereby generating marking decisions for the sharpness enhanced image data having halftone structures.

23. The image processor of claim 20 further comprising:
a rendering module that is operative to apply a halftone screen having frequency components that are harmonically compatible with respective frequency components of a halftone screen used to generate the received image to the sharpness enhanced image data having halftone structures, thereby generating marking decisions for the sharpness enhanced image data having halftone structures.

24. The image processor of claim 14 wherein the image combiner is operative to combine the received image data with the generated edge enhancement image by one of: logically ANDing, logically ORing, logically exclusive ORing, respective pixel values of the edge enhancement image, with respective pixel values of the received image data, thereby generating the sharpness enhanced image data having halftone structures as marking decisions.

25. The image processor of claim 14 further comprising at least one xerographic or ink jet based image output device that is operative to print a representation of the sharpness enhanced image data having halftone structures based on marking decisions generated from the sharpness enhanced image data having halftone structures.

26. A method for enhancing a sharpness of image data that includes halftone structures, the method comprising:
receiving the image data that includes halftone structures;
blurring the received image data, thereby generating blurred image data wherein a detectability of edges of the halftone structures is reduced from the detectability of the edges of the halftone structures in the received image data;
detecting detectable edges remaining in the blurred image data;
generating an edge enhancement image based on the detected edges; and
combining the received image data that includes halftone structure with the generated edge enhancement image, thereby generating sharpness enhanced image data having halftone structures; and
applying one of: halftone screening with at least one screen that is harmonically compatible with a screen used in generating the received image data, and rank order error diffusion to the sharpness enhanced image data having halftone structures, thereby rendering the image data as marking decisions for printing a representation of the sharpness enhanced image data having halftone structures.

* * * * *